US 9,835,376 B2

(12) United States Patent
Walkenhorst et al.

(10) Patent No.: US 9,835,376 B2
(45) Date of Patent: Dec. 5, 2017

(54) STATION AND METHOD FOR TRANSFERRING A METAL MELT FROM A MELTING FURNACE TO A TRANSPORT CRUCIBLE, AND ARRANGEMENT HAVING SUCH A STATION

(71) Applicant: Hydro Aluminium Rolled Products GmbH, Grevenbroich (DE)

(72) Inventors: Oliver Walkenhorst, Neuss (DE); Oliver Hommel, Neuss (DE)

(73) Assignee: Hydro Aluminium Rolled Products GmbH, Grevenbroich (DE)

( * ) Notice: Subject to any disclaimer, the term of this patent is extended or adjusted under 35 U.S.C. 154(b) by 0 days.

(21) Appl. No.: 15/315,771

(22) PCT Filed: Jun. 3, 2015

(86) PCT No.: PCT/EP2015/062411
§ 371 (c)(1),
(2) Date: Dec. 2, 2016

(87) PCT Pub. No.: WO2015/185646
PCT Pub. Date: Dec. 10, 2015

(65) Prior Publication Data
US 2017/0122665 A1 May 4, 2017

(30) Foreign Application Priority Data
Jun. 5, 2014 (EP) .................................... 14171399

(51) Int. Cl.
B22D 11/00 (2006.01)
F27D 3/14 (2006.01)
(Continued)

(52) U.S. Cl.
CPC ............... *F27D 3/14* (2013.01); *B22D 35/04* (2013.01); *B22D 37/00* (2013.01); *B22D 39/00* (2013.01);
(Continued)

(58) Field of Classification Search
CPC ..................................................... B22D 37/00
(Continued)

(56) References Cited

U.S. PATENT DOCUMENTS 1,944,733 A * 1/1934 Schoeffel ............... B22D 37/00
137/147
6,953,548 B2 * 10/2005 Mancusi ............... B22D 11/113
141/65
2004/0104520 A1 6/2004 Mancusi

FOREIGN PATENT DOCUMENTS

DE 20115148 U1 11/2001
GB 988127 4/1965
(Continued)

Primary Examiner — Scott Kastler
(74) Attorney, Agent, or Firm — The Webb Law Firm

(57) ABSTRACT

The invention relates to a station for transferring a metal melt from a melting furnace into a transport crucible. The station includes a docking chamber, which has a docking opening and is designed to be docked to a filling opening of the transport crucible a suctioning device, which is designed to suction a gas from the docking chamber or from the transport crucible docked to the docking chamber, and a suction pipe, which has a suction channel extending between an inlet opening and an outlet opening. The inlet opening is arranged outside the docking chamber and the outlet opening is arranged in such a way that a metal melt flowing through the suction channel and exiting from the outlet opening passes through the docking opening.

17 Claims, 5 Drawing Sheets

(51) Int. Cl.
  *B22D 35/04* (2006.01)
  *B22D 37/00* (2006.01)
  *F27B 3/04* (2006.01)
  *F27D 27/00* (2010.01)
  *B22D 39/00* (2006.01)
  *F27D 3/00* (2006.01)

(52) U.S. Cl.
  CPC ............ *F27B 3/045* (2013.01); *F27D 27/005* (2013.01); *F27D 2003/0054* (2013.01)

(58) Field of Classification Search
  USPC .......................................................... 266/239
  See application file for complete search history.

(56) References Cited

FOREIGN PATENT DOCUMENTS

JP    2010240701 A    10/2010
WO    02076656 A1    10/2002

\* cited by examiner

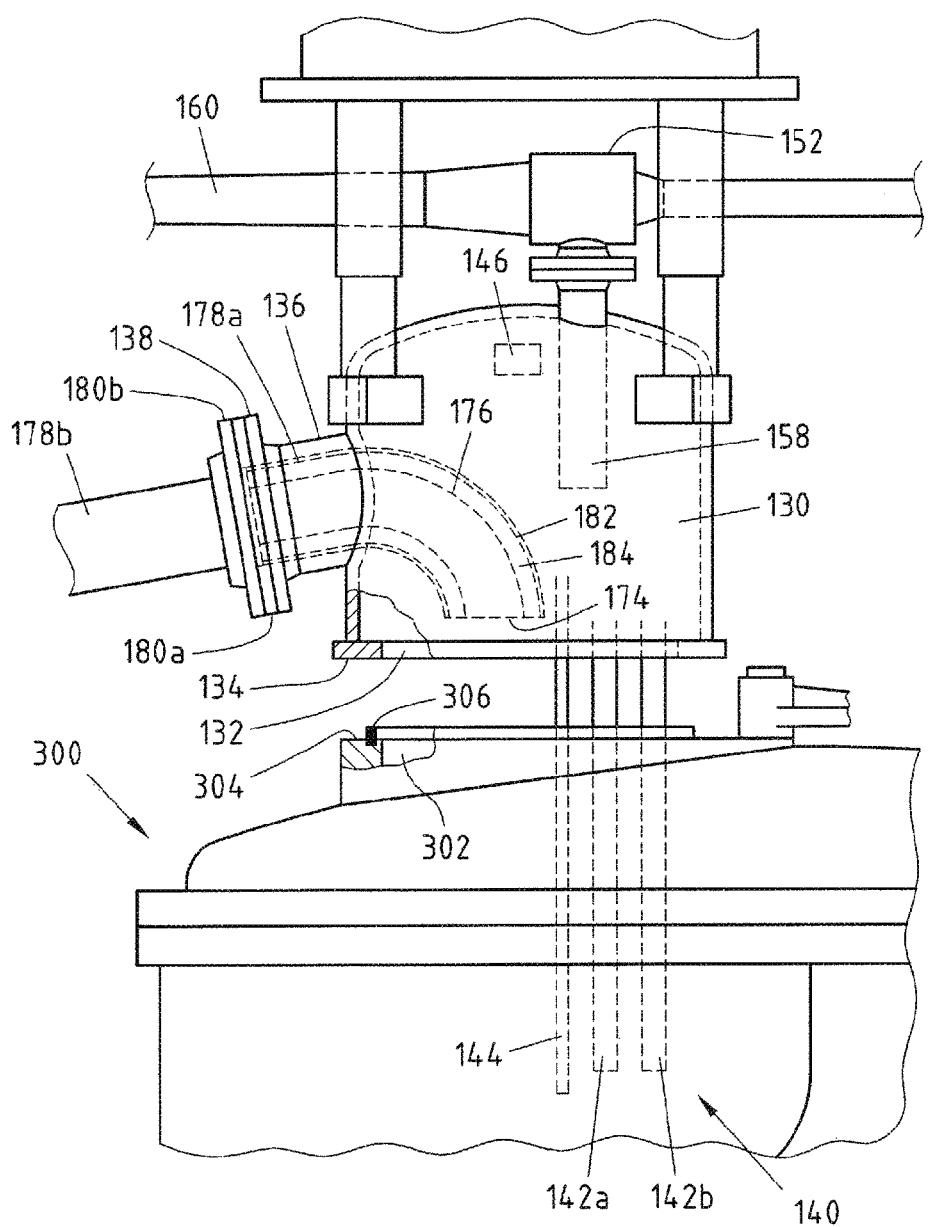
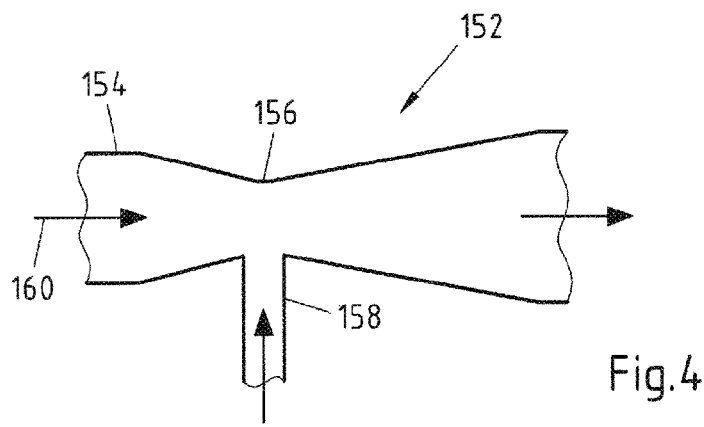
Fig.3
Fig.4

STATION AND METHOD FOR TRANSFERRING A METAL MELT FROM A MELTING FURNACE TO A TRANSPORT CRUCIBLE, AND ARRANGEMENT HAVING SUCH A STATION

CROSS-REFERENCE TO RELATED APPLICATIONS

This application is the United States national phase of International Application No. PCT/EP2015/062411 filed Jun. 3, 2015, and claims priority to European Patent Application No. 14171399.0 filed Jun. 5, 2014, the disclosures of which are hereby incorporated in their entirety by reference.

BACKGROUND OF THE INVENTION

Field of the Invention

The invention relates to a station and a method for transferring a metal melt from a melting furnace to a transport crucible. Furthermore, the invention relates to an assembly with a melting furnace and such a station as well as a system with such an assembly and a transport crucible.

Description of Related Art

Such stations and methods are used in the prior art in order to transfer a specific amount of a metal melt, for example an aluminium alloy, from a melting furnace to a transport crucible, so that the metal melt together can be transported with the transport crucible to a casting station, for example for casting slabs, ingots, semi-finished products or workpieces.

In the prior art, various methods are used for transferring the metal melt from the melting furnace to the transport crucible.

For example, in a first known method from the prior art, the whole melting furnace is hydraulically tilted so that the liquid metal can flow over a pouring lip of the melting furnace into a refractory lined channel. The metal then falls from this channel into a suitably positioned transport crucible. This method involves a mechanically complicated construction of the melting furnace and also a high technical effort on account of the hydraulic system required to tilt the melting furnace. Furthermore, the vigorous intermixing of the liquid metal when falling into the transport crucible as well as the intensive contact of the falling liquid metal with the ambient air lead to an undesired increased formation of slag.

In a further method known from the prior art the metal melt is transported by means of electromagnetic feed pumps from the melting furnace to a provided transport crucible. For this purpose, a magnetic field is generated, with which the metal melt can be conveyed through a corresponding pipe. This method is very susceptible to interference, since even fairly small cracks in the conveying pipe can lead to an electrical short-circuit and thus to the failure of the feed pump. Such a failure of the feed pump is a disadvantage since it can result in relatively long plant downtimes and therefore high costs.

In a further method known from the prior art mechanical feed pumps are used to transfer the metal melt to a transport crucible. For example, the metal melt can be conveyed by means of an electrically driven graphite rotor. The direct contact of the metal melt with the moveable mechanical parts of the feed pump leads to high thermal and mechanical stresses of these parts, which means that such feed pumps are subject to increased mechanical wear and therefore need frequent servicing and involve increased maintenance costs.

In a further method known from the prior art the melting furnace comprises mechanically closed tapholes. Such a taphole is installed on a stationary melting furnace on the side wall in the region of the lowest point of the furnace floor and is sealed with a mechanical sealing plug. In order to transfer the metal melt the plug is removed so that the metal melt can flow out from the melting furnace through the tapping hole and into a suitably arranged transport crucible. After the desired amount of metal has flowed out, the tapping hole is closed again. This method has the disadvantage that an accurate metering of the thereby transferred amount of metal is not possible. Furthermore, there is the danger that the tapping hole cannot be completely closed on account of dirt and contamination.

From JP 2010-240701 an automatic feed device for molten metal is known, which comprises a pipe that is immersed with one side in a melting furnace and is guided with the other side through a flat cover to a casting ladle. By reducing the pressure in the casting ladle with a vacuum pump, liquid metal is transferred from the furnace through the pipe to the casting ladle. A similar feed device is also known from WO 02/076656 A1. These devices have the disadvantage however that the liquid metal transferred to the casting ladle can easily splash around and thereby damage or contaminate critical components of the station.

SUMMARY OF THE INVENTION

Starting from this prior art the object of the present invention is to provide a device and a method for transferring a metal melt from a melting furnace to a transport crucible, in which the aforementioned disadvantages of the prior art do not arise or at least only to a lesser extent.

This object is achieved according to the invention by a station for transferring a metal melt from a melting furnace to a transport crucible with a docking chamber that has a docking opening and is configured for being docked with the docking opening to a filling opening of a transport crucible, with a suction device that is arranged to suction a gas from the docking chamber and/or from a transport crucible docked to the docking chamber, and with a suction pipe that has a suction channel extending between an inlet opening and outlet opening, wherein the inlet opening is arranged outside the docking chamber and the outlet opening is arranged such that a metal melt flowing through the suction channel and exiting from the outlet opening passes through the docking opening.

With such a station, a metal melt can be transferred from a melting furnace into a transport crucible without moveable mechanical plant parts thereby coming into contact with the metal melt. Furthermore, the components of the station required for the transfer of the metal melt, in particular the suction pipe and the suction device, do not have to be directly connected to the furnace, so that it is possible to service and maintain the station and replace components of the station practically any time during the operation of the melting furnace. In this way, the failure of the suction pipe for example does not lead to a shutdown of the melting furnace, since the suction pipe can be replaced without having to switch off the melting furnace for this purpose. The plant availability can thus be raised.

Furthermore, an improvement of the work safety can be achieved with the invention, since a spattering of metal melt, for example through open channel systems or non-tight tapping holes, cannot occur during the transfer of the metal melt to the transport crucible since the metal melt is transported in a closed system.

The station serves to transfer a metal melt from a melting furnace into a transport crucible. The metal melt can, in particular, be an aluminium alloy and the melting furnace can accordingly be a melting furnace for aluminium alloys. The station is preferably installed stationary in the region of such a melting furnace. Instead of aluminium or an aluminium alloy the metal melt can also be another metal or another metal alloy, for example a Mg alloy, a Cu alloy or a Pb alloy.

Parts of the station coming into contact with the metal melt, in particular the suction pipe, are preferably adapted to the metal melt to be transported. For example the station, in particular the suction pipe, can comprise refractory material such as for example a ceramic material, in order to improve the thermal and/or chemical resistance. The suction pipe can for example be lined with refractory material. For a station for transferring aluminium or an aluminium alloy, the station, in particular the suction pipe, is preferably designed for temperatures of the metal melt of more than 740° C.

The station includes a docking chamber, which has a docking opening. The docking chamber is preferably designed as a low-pressure chamber, for example as a low-pressure bell. For this purpose the docking chamber preferably has a geometry that is designed for the mechanical stresses produced by a reduced pressure in the interior of the docking chamber, preferably down to a pressure difference of at least 0.3 bar, preferably at least 0.6 bar, relative to the ambient pressure. With an assumed ambient pressure of 1 bar this corresponds for example to an internal pressure of 0.7 bar or less, or of 0.4 bar or less, respectively. Furthermore, the docking chamber is preferably designed for a sufficient sealing, so that a corresponding reduced pressure can be maintained in the docking chamber.

The docking chamber is configured to be docked with the docking opening to a filling opening of a transport crucible. For this purpose, the docking chamber can have in the region of the docking opening a docking flange region for example, which preferably has a flat contact surface for placement on a corresponding contact surface at a filling opening of a transport crucible and/or a seal so that the docking chamber can be docked in a gas-tight manner to the filling opening of a transport crucible. The term docking is here understood to mean that the docking opening of the docking chamber is arranged in such a way at the filling opening of a transport crucible that a substantially gas-tight connection with respect to the surroundings is formed between the docking opening and the filling opening or between the interior of the transport crucible and the interior of the docking chamber, respectively.

By using a docking chamber instead of for example a flat cover, problems caused by liquid metal spattering when transferring the metal melt can be reduced. In particular a docking chamber docked to a transport crucible provides with its interior a spatial region that on the one hand is connected to the interior of the transport crucible, so that by suctioning a gas from the docking chamber the pressure in the transport crucible can be reduced, and on the other hand is arranged outside the transport crucible so that liquid metal splashing around in the transport crucible does not reach, or only to a minor extent, the spatial region of the docking chamber.

In this way components that are connected to the docking chamber or are at least partially arranged in the latter are protected against metal splashing. In particular the suction device can be protected in this way against metal splashing, so that essentially no liquid metal can reach the suction device and accordingly its service life is increased. To this end the docking chamber preferably has an interior height of at least 20 cm, more preferably at least 30 cm.

The station furthermore comprises a suction device. As a suction device in principle any device can be used that is capable of removing a gas from the docking chamber, i.e. from the interior of the docking chamber. For example the suction device can include a pump or also a Venturi nozzle. The suction device is preferably configured such that with the suction device a reduced pressure can be achieved in the docking system and/or in a transport crucible docked to the docking chamber with a pressure difference relative to the ambient pressure of at least 0.3 bar, in particular at least 0.6 bar.

The suction device is configured to suction a gas from the docking chamber and/or from a transport crucible docked to the docking chamber. For this purpose the suction device preferably comprises a suck-in channel with a suck-in opening for sucking in a gas, wherein the suck-in opening is arranged in the docking chamber or the suck-in channel extends from the docking opening, so that during operation a gas can be suctioned from the docking chamber and/or from a transport crucible docked to the docking chamber, through the suck-in opening and the suck-in channel.

Furthermore, the station comprises a suction pipe, which has a suction channel extending between an inlet opening and an outlet opening. The suction pipe is designed, in particular, for conducting metal melt, i.e. in particular for the thermal and mechanical stresses associated therewith. Preferably the suction pipe consists substantially of metal and/or refractory material, such as for example a ceramic material. The suction pipe can be formed in one part or several parts, for example as a plurality of tubular sections flanged to one another. The suction channel is preferably formed substantially gas-tight between the inlet opening and the outlet opening, so that a rising metal melt in the suction pipe does not collapse during suctioning.

The inlet opening of the suction pipe is preferably arranged outside the docking chamber. In particular the inlet opening is arranged such that it can be immersed in the metal melt of a melting furnace. For example, the suction pipe in the region of the inlet opening can have a substantially vertically extending tubular region, which can be inserted from above into an extraction opening of a melting furnace and can thus be immersed into a metal melt in the melting furnace.

The outlet opening is arranged such that a metal melt flowing through the suction channel and exiting from the outlet opening passes through the docking opening. For this purpose the suction pipe preferably runs from the inlet opening outside the docking chamber through an opening in the wall of the docking chamber or through an attachment pipe provided at the docking chamber, respectively, into the interior of the docking chamber. The outlet opening can for example be arranged inside the docking chamber or in the plane of the docking opening, so that during the operation of the station a metal melt exiting from the outlet opening falls through the docking opening and thus flows into a transport crucible docked to the docking chamber. Alternatively, the suction channel can extend through the docking opening, so that the docking opening is arranged for example underneath the docking chamber. A metal melt flowing through the suction pipe during operation then passes through the docking opening while it is still in the suction channel, and then after exiting through the outlet opening falls into a transport crucible docked to the docking chamber.

The aforementioned object is furthermore achieved according to the invention by an assembly with a melting furnace that has an extraction opening for removing a metal melt, and with the previously described station, wherein the station is configured such that the inlet opening of the suction pipe can be immersed through the extraction opening of the melting furnace into a metal melt in the melting furnace.

The extraction opening is preferably arranged on an upper side of the melting furnace or a part thereof, so that the suction pipe can be immersed from above into the extraction opening of the melting furnace and thus into the metal melt in the melting furnace. For example the melting furnace can have an extraction region, on the upper side of which is arranged the extraction opening.

The station is configured such that the inlet opening of the suction pipe can be immersed through the extraction opening of the melting furnace into a metal melt in the melting furnace. For this purpose, the station can in particular comprise suitable drive means by means of which the inlet opening of the suction pipe can preferably be immersed substantially vertically into a metal melt in the melting furnace.

The station is preferably arranged fixed in position, in particular in a specific position relative to the melting furnace. In this way the station does not have to be re-adjusted with each transfer procedure depending on its position relative to the melting furnace, so that a quicker and more efficient filling of a transport crucible or several transport crucibles in succession with metal melt is possible.

The aforementioned object is furthermore achieved according to the invention by a system comprising the previously described assembly as well as a transport crucible with a filling opening, whereby the docking chamber is configured for being docked with the docking opening to the filling opening of the transport crucible.

The filling opening is preferably located on the upper side of the transport crucible, so that the docking chamber can be docked with the docking opening to the filling opening by a substantially vertical movement. The docking chamber and the transport crucible are preferably adapted to each other such that a tight connection between the docking opening and the filling opening of the transport crucible can be produced with the docking chamber. For this purpose the docking chamber around the docking opening and the transport crucible around the filling opening may have in particular docking surfaces corresponding to one another, which can be arranged abutting one another when docking the docking chamber. To produce a tight connection between the docking opening and the filling opening the corresponding docking surfaces can be pressed against one another when docking. At least one of the docking surfaces can have a seal, for example a sealing ring, which during docking is pressed against the corresponding other docking surface. The seal can be applied to the docking surfaces in particular by means of a dovetail connection. In particular a dovetail groove can be recessed in one of the docking surfaces, into which the seal is inserted. In this way the seal can reliably be held in a fixed position.

Whereas the melting furnace and the station preferably have a specific fixed position relative to one another, the transport crucible serves to transport the metal melt to another site, such as for example to a casting station, and is therefore in principle moveable relative to the melting furnace and the station. For the duration of the transfer of the metal melt from the melting furnace to the transport crucible by means of the station, the crucible however preferably takes a fixed position relative to the station, which is herein referred to as the filling position.

The aforementioned object is furthermore achieved according to the invention by a method for transferring a liquid metal from a melting furnace to a transport crucible by means of the previously described assembly, in which the method comprises the following steps: providing a transport crucible in a filling position, in particular a transport crucible according to the afore-described system, docking the docking chamber with the docking opening to a filling opening of the transport crucible, positioning the inlet opening of the suction pipe in a metal melt in the melting furnace, and activating the suction device, so that a reduced pressure relative to the ambient pressure is generated in the docking chamber and/or the transport crucible, so that the metal melt is suctioned through the inlet opening of the suction pipe and passes through the suction channel into the transport crucible. The steps of this method can be carried out in the aforementioned sequence. It is however also possible to execute the steps in another sequence and/or to execute several steps simultaneously.

In one step of the method, the transport crucible is provided in a filling position. In the filling position, the transport crucible is in particular arranged such relative to the station of the assembly so that the docking chamber can be docked with the docking opening to the filling opening of the transport crucible, preferably by a movement of the docking chamber in a substantially vertical direction.

In a further step of the method, the docking chamber of the station is docked with the docking opening to the filling opening of the transport crucible. In this case preferably the docking chamber is moved relative to the transport crucible so that the docking opening is arranged opposite the filling opening and the interior of the docking chamber can be connected to the interior of the transport crucible via the docking opening and the filling opening, preferably by means of a connection that is substantially gas-tight with respect to the surroundings.

In a further step of the method, the inlet opening of the suction pipe is positioned in a metal melt in the melting furnace. For this purpose the inlet opening can for example be immersed through the extraction opening of the metal furnace into a metal melt in the melting furnace. Preferably the suction pipe is introduced in a substantially vertical movement through the extraction opening into the melting furnace and immersed into the metal melt.

The aforementioned step can take place for example before, after or also at the same time as the step of docking the docking chamber to the transport crucible. The extraction opening of the suction pipe can also remain for a relatively long time in the metal melt in the melting furnace, for example for the time required to fill several transport crucibles. Alternatively the extraction opening of the suction pipe can also be withdrawn from the metal melt after each filling of a transport crucible.

In a further step of the method, the suction device is activated so that a reduced pressure relative to the ambient pressure is generated in the docking chamber and/or in the transport crucible. Due to the activation of the suction device a gas is suctioned from the docking chamber, so that the pressure in the suction chamber and/or in the transport crucible coupled thereto is lowered to a value below the ambient pressure outside the transport crucible. The metal melt is then transported by the higher ambient pressure and the correspondingly lower pressure in the suction channel through the inlet opening of the suction channel and through the latter to the outlet opening of the suction channel, so that the metal melt flows through the docking opening and the filling opening into the transport crucible. In this way the transport crucible is filled little by little with metal melt from the melting furnace.

The metal melt when entering the suction channel preferably has a temperature that is at least 80° C., preferably at least 100° C., in particular at least 110° C. above the melting point of the metal melt. If the metal melt is an aluminium alloy, then its temperature when entering the suction channel is preferably at least 740° C., and more preferably at least 770° C. In this way the risk that the temperature of the metal melt within the suction channel falls below the melting point and solidifies there can be reduced or even eliminated.

In addition, the temperature of the metal melt when entering to the suction channel is preferably at most 850° C., preferably at most 820° C., in particular at most 800° C. At higher temperatures the service life of the station is significantly reduced on account of the high thermal stress. Furthermore, higher temperatures require the use of special materials for the station or complicated cooling mechanisms, respectively, and therefore lead to higher costs.

When the transport crucible contains the desired amount of metal melt, the transfer of metal melt can be stopped by deactivating the suction device. In this way the amount of transferred metal melt can be accurately metered.

It has been found that with the previously described method as well as with the associated station for transferring metal melt from a melting furnace into a transport crucible or with the described assembly or with the described system, respectively, a transfer of a metal melt from the melting furnace to the transport crucible is possible without moveable, mechanical components such as for example screw conveyors or pump parts coming into direct contact with the metal melt. In this way, a robust transfer process with comparatively low maintenance costs is achieved. Furthermore, in this way an improvement in the work safety can also be achieved, since when filling the transport crucible, on account of the closed reduced pressure system no splashing of metal melt from an open channel for example can occur and furthermore substantially closed transport crucibles can be used, so that also when moving the transport crucible no undesired escape of metal melt from the transport crucible can occur.

Furthermore the described station, the assembly, the system and the method can also lead to an increase in productivity and process stability, since the filling procedure of the transport crucible can be shortened compared to other filling methods. Also possible plant downtimes can be curtailed in this way, since the station can for example be serviced and repaired also when the melting furnace is full.

Various embodiments for the afore-described station, the afore-described assembly, the afore-described system and also the afore-described method are described hereinafter. The embodiments can in this connection be appropriately applied to all previously mentioned categories (station, assembly, system, method), even if they are hereinafter only partially described in detail for the individual categories.

According to a first embodiment, the station has a fixed framework, to which the docking chamber, the suction device and/or the suction pipe can respectively be directly or indirectly connected. Preferably the framework is a framework that is firmly connected to the base or to some other stationary structure. In this way a stationary station is provided, which can be arranged for example in the immediate vicinity of a melting furnace, so that the transport crucibles to be filled simply have to be driven one after the other to the station. In this way a quicker and simpler filling procedure can be achieved.

The expression "directly connected" is understood here to mean that a component (for example the docking chamber) can be directly connected to another component (e.g. the framework). The expression "indirectly connected" is understood here to mean that a component (for example the suction pipe) is connected via at least a third component (for example the docking chamber) to the respective other component (for example the framework).

According to a further embodiment the station comprises a lifting device that is configured to execute a substantially vertical movement of the docking chamber and/or the suction pipe. The docking of the docking chamber to the filling opening of a transport crucible and/or the immersion of the inlet opening of the suction pipe into a metal melt in the melting furnace can easily be implemented with this lifting device without complicated movement sequences of the station and/or parts thereof being required. Preferably the lifting device simultaneously moves the docking chamber and the suction pipe, so that in particular a second lifting device can be dispensed with. Alternatively two separate lifting devices can however also be provided for moving the docking chamber and the suction pipe, so that the docking chamber and the suction pipe can be driven independently of one another. In this way the inlet opening of the suction pipe can for example remain in the metal melt for several filling procedures.

The lifting device is preferably fastened to a stationary framework. For example, the lifting device can include a linear drive fixed to a framework, which linear drive is configured to drive an outrigger substantially in a vertical direction. The docking chamber can be mounted directly or indirectly on the outrigger, so that it can be driven by movement of the linear drive in the vertical direction.

According to a further embodiment the station has a sensor, preferably within the docking chamber, which is configured to detect whether a filling opening of a transport crucible is arranged underneath the docking chamber and/or whether the filling opening of the transport crucible is free for the docking of the docking chamber.

Preferably the sensor is configured to detect whether the filling opening of the transport crucible is closed with a cover or not. The sensor can for example be an optical sensor. Preferably a control device configured to control the station is provided, which control device is configured to control the station as a function of the signal of the sensor. For example the control device can be configured to allow a driving of the docking chamber with a lifting device for the docking of the docking chamber to the filling opening only if the sensor indicates that the filling opening is free for the docking of the docking chamber. In this way, collisions of the docking chamber or of components of the docking chamber with for example a cover for the filling opening of the transport crucible can be prevented. The sensor can for example be arranged on or in the docking chamber.

In order to protect the sensor against external influences and for the suitable positioning above the filling opening it can be arranged within the docking chamber, and specifically preferably at least 5 cm, more preferably at least 10 cm, above the docking opening. In this way the sensor can be protected against damage by metal melt splashing around in the transport crucible.

According to a further embodiment, in particular an embodiment of the station, the docking chamber is resiliently supported, in particular in the vertical direction. To this end the docking chamber can be mounted for example by means of at least one spring, in particular a mechanical spring or a gas pressure spring, on a structural part provided for this purpose, such as for example on the previously described outrigger that can be driven substantially in a vertical direction. Owing to the resilient support of the docking chamber there is a greater clearance when docking the docking chamber with the docking opening to the filling opening of a transport crucible. In particular, by means of the resilient support the docking chamber can over the whole circumference of the docking opening rest against the filling opening. On the one hand damage to the docking chamber or to the transport crucible can be prevented in this way. On the other hand, a tight connection between the docking chamber and the transport crucible can be achieved more reliably in this way.

According to a further embodiment the station has a rotary drive for swivelling the inlet opening of the suction pipe. The rotary drive can for example be configured to swivel the suction pipe or also the docking chamber together with the suction pipe. In this way in particular the suction pipe can be swivelled out of the region of the melting furnace, so that during operation, i.e. with the melting furnace being full, the suction pipe can be exchanged or repaired. In this way changes or repairs can be carried out during routine operation and downtimes can thus be reduced.

If the docking chamber is fastened to an outrigger of a framework, then the rotary drive for swiveling the inlet opening of the suction pipe can be arranged for example between the outrigger and the docking chamber. In this way the docking chamber can be turned and the suction pipe can be swiveled.

According to a further embodiment, in particular of the station, the docking chamber has an attachment pipe that is configured for mounting the suction pipe to the docking chamber. The attachment pipe can for example be welded to a wall of the docking chamber. Preferably the attachment pipe has a flange for fastening the suction pipe to the attachment pipe. In this way the suction pipe can be joined by means of a flange connection to the attachment pipe. Thanks to this construction the suction pipe can be installed relatively simply to the docking chamber and can be dismantled from the latter, so that a replacement or maintenance of the suction pipe is simplified.

The suction pipe preferably has a section that can be guided through the attachment pipe into the docking chamber. The section is preferably replaceable. In this way metal melt can be fed through the suction pipe into the docking chamber without the metal melt coming into direct contact with the attachment pipe. The section of the suction pipe that can be guided through the attachment pipe into the docking chamber preferably has a flange, which can be connected to the flange of the attachment pipe. The suction pipe can furthermore include a second section with a flange, which can be joined to the flange of the first section and/or to the flange of the attachment pipe. Preferably the flange of the first section can be arranged between the flange of the attachment pipe and the flange of the second section and connected, in particular screwed, to the latter.

The section of the suction pipe that can be guided through the attachment pipe into the docking chamber is preferably lined with refractory material, such as for example a ceramic material. This section is subjected to particularly high thermal and chemical stresses due to the metal melt, in particular if the metal melt is diverted in this section. Owing to the refractory material the wear of the section can be reduced and its service life can be extended.

According to a further embodiment the outlet opening of the suction pipe is arranged within the docking chamber. The outlet opening if therefore preferably arranged above the outlet opening, and specifically preferably at least 5 cm, in particular at least 10 cm, above the outlet opening. In this way the outlet opening in the docked state of the docking chamber is set back with respect to the interior of the transport crucible, so that metal melt splashing around in the transport crucible can no longer, or at least only to a lesser extent, reach the suction pipe. In particular the formation of slag lumps at the outlet opening of the suction pipe can thereby be prevented. In addition it is ensured in this way that the metal melt can run out completely from the suction pipe, so that there is no possibility of a blockage of the suction pipe on account of solidified metal melt.

According to a further embodiment the suction device has a suck-in channel with a suck-in opening for suctioning a gas, wherein the suck-in opening is arranged in the docking chamber and specifically above the docking opening, preferably at least 5 cm, more preferably at least 10 cm above the docking opening. In this way metal melt splashing around in the transport crucible is prevented from entering the suction device and interfering in its function.

According to a further embodiment the station has a filling level sensor connected to the docking chamber, which filling level sensor is configured to detect whether a predetermined filling level within a transport crucible docked with a filling opening to the docking opening is exceeded.

In the docked state of the docking chamber, i.e. when the docking chamber has docked with the docking opening to the filling opening of a transport crucible, a visual inspection of the interior of the transport crucible and the filling level within the transport crucible is not possible, or only with difficulty. By providing a filling level sensor it can be ensured that nevertheless a reliable check of the filling level within the transport crucible is possible.

The filling level sensor can for example be implemented by two electrodes extending from the docking chamber through the docking opening, which in the docked state to the transport crucible extend into the interior of the transport crucible. As soon as the metal melt within the transport crucible comes into contact with both electrodes this produces a short-circuit of the electrodes, so that in this way it can be determined at what point in time the filling height of the metal melt in the transport crucible has reached the lower end of the electrodes. For example, in this way an emergency shutdown can be activated in order to prevent the filling level within the transport crucible exceeding a predetermined limiting value. Alternatively or in addition the transport crucible can also be weighed during the transfer of a metal melt, for example by a weighing device in a transfer carriage carrying the transport crucible. The filling level sensor provides additional security in the event of failure of such a weighing device.

According to a further embodiment, in particular an embodiment of the station, the suction device configured to suction a gas from the docking chamber comprises a Venturi nozzle. A Venturi nozzle is understood here to mean a structural component with a flow channel, whereby the flow channel has a cross-sectional constriction and wherein in the region of the cross-sectional constriction, a suck-in channel terminates into the flow channel. When a gas is led through the flow channel there is a drop in pressure in the region of the cross-sectional constriction, resulting in gas being suctioned from the suck-in channel into the flow channel. The suck-in channel is preferably connected to the docking chamber, so that in this way gas can be suctioned from the docking chamber and/or from a transport crucible docked to the latter and thereby a reduced pressure can be generated in the docking chamber and/or in a transport crucible docked to the docking chamber.

The gas suctioned from the transport crucible through the docking chamber often contains a large amount of dust or other impurities, so that the use of mechanical pumps to suction the gas would lead to an increased maintenance intervention on account of the contact of moveable mechanical pump parts with the dust-containing gas. Owing to the use of a Venturi nozzle, the dust-containing gas can be suctioned without coming into contact with moveable pump parts, resulting in a reduced maintenance expenditure. Preferably the station has a compressed air line to supply the Venturi nozzle with compressed air.

According to a further embodiment, the assembly comprises a transfer carriage that is configured to drive a transport crucible between an access position and a filling position relative to the station, wherein the filling station is arranged so that the docking chamber can be docked at a filling opening of a transport crucible when this is situated in the filling position.

Preferably the assembly comprises a linear drive for the linear movement of the transfer carriage between the placing position and the filling position. In addition the transfer carriage preferably comprises a platform onto which the transport crucible can be placed for the movement from the placing position to the filling position, and vice versa.

The placing position is preferably arranged such that the transport crucible in the placing position can be arranged in a simple way on the transfer carriage or lifted down from the carriage, respectively, without interference from the station. In this way, the placing and pickup of the transport crucible can be separated spatially from the filling position, so that for example no collisions with the station can occur during the adjustment and removal of the transport crucible.

Preferably the transfer carriage has one or more positioning devices that are configured to position a transport crucible in a predetermined position on the transfer carriage. In particular the transfer carriage can have receptacles for accommodating feet of a transport crucible, so that a transport crucible can be reliably positioned in a predetermined position on the transfer carriage.

The assembly preferably has a sensor that is configured to determine whether the transfer carriage is positioned in the filling position, as well as means for controlling a linear drive for the linear movement of the transfer carriage from the placing position to the filling position as a function of the signal of this sensor. The sensor can be a limit switch, such as for example a contact switch or a photoelectric barrier. In this way the transfer carriage can be reliably driven to the filling position.

Preferably the assembly is configured such that a transport crucible can be positioned in such a way in a predetermined position on the transfer carriage and can be driven by a linear movement of the transfer carriage to the filling position, that a filling opening of the transport crucible can be positioned at a predetermined position underneath the docking chamber and the docking chamber can be docked by a vertical movement to the filling opening of the transport crucible. For this purpose the transfer carriage preferably has one or more positioning devices as described hereinbefore, and the assembly preferably has a sensor as described hereinbefore for the reliable positioning of the transfer carriage in the filling position. In particular the docking chamber is aligned in the horizontal direction in such a way relative to the filling position of the transfer carriage that no swivelling movement of the docking chamber is required in order to dock the docking chamber to the filling opening of the transport crucible.

It was recognised that the docking process can be carried out more reliably and quicker by a purely linear movement and thus uniaxial movement of the transport crucible to the filling position and by a purely vertical movement and thus also uniaxial movement of the docking chamber for the docking to the filling opening of the transport crucible. In this way a tight connection between the docking chamber and the transport crucible can be produced quickly and reliably, so that the metal melt can be transferred smoothly to the transport crucible. In particular the flow of the metal melt can be prevented from slowing down or coming to a standstill in the suction pipe on account of a loose connection between the docking chamber and transport crucible, and the metal melt can be prevented from solidifying in the suction pipes.

According to a further embodiment the assembly comprises a weighing device, which is arranged and configured to weigh a transport crucible during the transfer of a metal melt from the melting furnace to the transport crucible. In this way the amount of metal melt transferred during the transfer can be monitored and thereby accurately metered. The weighing device can for example be integrated in the previously described transfer carriage.

Preferably the assembly includes a control device, which is configured to control the assembly, in particular the suction device, as a function of a signal from the weighing device, in particular in such a way that a predetermined or predeterminable amount of metal melt is transferred to the transport crucible. If for example a desired amount of the metal melt (e.g. in tonnes) is entered into the control device, then the control device is preferably configured to switch off the suction device when the desired amount of the metal melt has been transferred to the transport crucible. In this way desired amounts of metal melt can be filled into the transport crucible as required.

According to a further embodiment, in particular an embodiment of the system, the transport crucible is suitable for producing a reduced pressure in the interior of the transport crucible through the filing opening, in particular for a pressure difference relative to the ambient pressure of at least 0.3 bar, preferably at least 0.6 bar. With an assumed ambient pressure of 1 bar, this would correspond to a pressure of 0.7 bar of less, or a pressure of 0.4 bar or less.

To this end the transport crucible is preferably on the one hand structurally designed for such a pressure difference relative to the ambient pressure, so that it can withstand the forces produced by such a pressure difference. On the other hand the transport crucible is preferably formed suitably gas-tight, so that by suctioning a gas through the filling opening a corresponding reduced pressure can be produced in the transport crucible. If the transport crucible has apart from the filling opening also further openings, then these can in particular be tightly closed so that the aforementioned reduced pressures can be achieved. Preferably the transport crucible has for this purpose at least one cover connected to the transport crucible for closing such an opening.

Preferably the transport crucible includes a cover that is designed to close the filling opening, so that the filling opening can be closed during the transport of the transport crucible. Preferably the cover has a connection pipe for ventilating the interior, so that reduced pressures and excess pressures in the transport crucible can be compensated during transportation or when emptying the transport crucible.

According to a further embodiment, in particular an embodiment of the system, the transport crucible has a filling spout for pouring out metal melt from the transport crucible, as well as a cover for closing the filling spout. In this way a metal melt can be poured out in a metered manner from the filling spout, for example into a casting mould, by tilting the transport crucible. The filling spout can preferably be closed with a cover, so that a reduced pressure can be produced in the transport crucible by suctioning a gas from the filling opening. The cover can for example be articulatedly connected to the transport crucible so that the filling spout can be easily and reliably closed by swiveling the cover.

According to a further embodiment, in particular an embodiment of the method, a reduced pressure is produced in the docking chamber and/or in the transport crucible, with a pressure difference relative to the ambient pressure in the range 0.3-0.8 bar, preferably 0.6-0.7 bar. With an assumed ambient pressure of 1 bar this corresponds to a pressure in the transport crucible of for example 0.7-0.2 bar and 0.4-0.3 bar.

It has been found that the metal melt can no longer be reliably transferred to the transport crucible if the pressure difference relative to the ambient pressure is less than 0.3 bar. For a pressure difference of more than 0.8 bar relative to the ambient pressure a significantly increased technical effort is required. Furthermore, with such a large pressure difference the flow rate of the metal melt may be so large that it is difficult to accurately meter the amount of the transferred metal melt. Optimal results for a reliable and accurately metered transfer of the metal melt to the transport crucible were achieved with pressure differences in the range from 0.6 to 0.7 bar.

Further embodiments 1-13 of the station, further embodiments 14-16 of the assembly, further embodiments 17-19 of the system and further embodiments 20-21 of the method are described hereinafter. The embodiments 1-21 can be combined with the previously described embodiments.

1. Station for transferring a metal melt from a melting furnace to a transport crucible, with a docking chamber that has a docking opening and is configured for being docked with the docking opening to a filling opening of a transport crucible, with a suction device that is configured to suction a gas from the docking chamber and/or from a transport crucible docked to the docking chamber, and with a suction pipe that has a suction channel extending between an inlet opening and an outlet opening, wherein the inlet opening is arranged above the docking chamber and the outlet opening is arranged such that a metal melt flowing through the suction channel and exiting from the outlet opening passes through the docking opening.
2. Station according to embodiment 1, wherein the station includes a stationary framework to which the docking chamber, the suction device and/or the suction pipe are respectively directly or indirectly connected.
3. Station according to embodiment 1 or 2, wherein the station contains a lifting device that is configured for the substantially vertical movement of the docking chamber and/or of the suction pipe.
4. Station according to one of embodiments 1 to 3, wherein the docking chamber is resiliently supported.
5. Station according to one of the embodiments 1 to 4, wherein the station has a rotary drive for swiveling the inlet opening of the suction pipe.
6. Station according to one of the embodiments 1 to 5, wherein the station has a filling level sensor connected to the docking chamber, which is configured to detect whether a predetermined filling level within a transport crucible docked with a filling opening to the docking opening is exceeded.
7. Station according to one of the embodiments 1 to 6, wherein the suction device configured for suctioning a gas from the docking chamber includes a Venturi nozzle.
8. Station according to one of the embodiments 1 to 7, wherein the docking chamber includes an attachment pipe that is configured for mounting the suction pipe to the docking chamber, in particular by means of a flange connection.
9. Station according to one of embodiment 8, wherein the suction pipe has a preferably exchangeable section (178a) that can be guided through the attachment pipe into the docking chamber.
10. Station according to one of the embodiments 1 to 9, wherein the suction device has a suck-in channel with a suck-in opening for suctioning a gas, wherein the suck-in opening is arranged in the docking chamber, and specifically preferably above the docking opening, in particular at least 5 cm, preferably at least 10 cm, above the docking opening.
11. Station according to one of the embodiments 1 to 10, wherein the outlet opening is arranged above the docking opening, and specifically preferably at least 5 cm, in particular at least 10 cm, above the docking opening.
12. Station according to one of the embodiments 1 to 11, wherein the station has a sensor, preferably within the docking chamber, wherein the sensor is configured to detect whether a filling opening of a transport crucible is arranged underneath the docking chamber and/or whether the filling opening of the transport crucible is free for the docking of the docking chamber.
13. Assembly with a melting furnace that includes a extraction opening for removing a metal melt, and with a station according to one of the embodiments 1 to 12, wherein the station is configured such that the inlet opening of the suction pipe can be immersed through the extraction opening of the melting furnace into a metal melt in the melting furnace.
14. Assembly according to embodiment 13, including a transfer carriage, which is configured to drive a transport crucible between an placing position and a filling position relative to the station, wherein the filling position is arranged such that the docking chamber can be docked at a filling opening of a transport crucible when this is in the filling position.
15. Assembly according to embodiment 13 or 14, including a weighing device that is arranged and configured for weighing a transport crucible during the transfer of a metal melt from the melting furnace to the transport crucible.
16. Assembly according to one of the embodiments 13 to 15, wherein the station contains a lifting device that is configured for the substantially vertical movement of the docking chamber and/or the suction pipe, and that the assembly is configured such that a transport crucible can be positioned in a predetermined position on the transfer carriage and can be driven by a linear movement of the transfer carriage to the filling position, so that a filling opening of the transport crucible can be positioned at a predetermined position underneath the docking chamber and the docking chamber can be docked by a vertical movement to the filling opening of the transport crucible.

17. System including an assembly according to one of the embodiments 13 to 16 and a transport crucible with a filling opening, wherein the docking chamber is configured for being docked with the docking opening to the filling opening of the transport crucible.
18. System according to embodiment 17, wherein the transport crucible is suitable for generating a reduced pressure in the interior of the transport crucible through the filling opening, in particular for a pressure difference relative to the ambient pressure of at least 0.3 bar, preferably at least 0.6 bar.
19. System according to embodiment 17 or 18, wherein the transport crucible has a filling spout for pouring metal melt from the transport crucible as well as a cover for tightly closing the filling spout.
20. Method for transferring a metal melt from a melting furnace to a transport crucible by means of an assembly according to one of the embodiments 13 to 16, including the following steps:
   Providing a transport crucible in a filling position, in particular a transport crucible according to a system of one of the embodiments 17 to 19,
   Docking the docking chamber with the docking opening to a filling opening of the transport crucible,
   Positioning of the inlet opening of the suction pipe in a metal melt in the melting furnace,
   Activating the suction device so that a reduced pressure relative to the ambient pressure is generated in the docking chamber and/or in the transport crucible, so that the metal melt is suctioned through the inlet opening of the suction pipe and passes through the suction channel into the transport crucible.
21. Method according to embodiment 20, wherein in the docking chamber and/or in the transport crucible a reduced pressure is generated with a pressure difference relative to the ambient pressure in the range from 0.3 to 0.8 bar, preferably 0.6 to 0.7 bar.

BRIEF DESCRIPTION OF THE DRAWINGS

Further features and advantages of the station, the assembly, the system and the method are described hereinafter with the aid of exemplary embodiments, in which reference is made to the accompanying drawings:

FIG. 3 shows an enlarged section from FIG. 1 at another point in time of the method, FIG. 4 shows a schematic representation of the Venturi nozzle of FIG. 1.

DETAILED DESCRIPTION OF THE INVENTION

Figure 1:
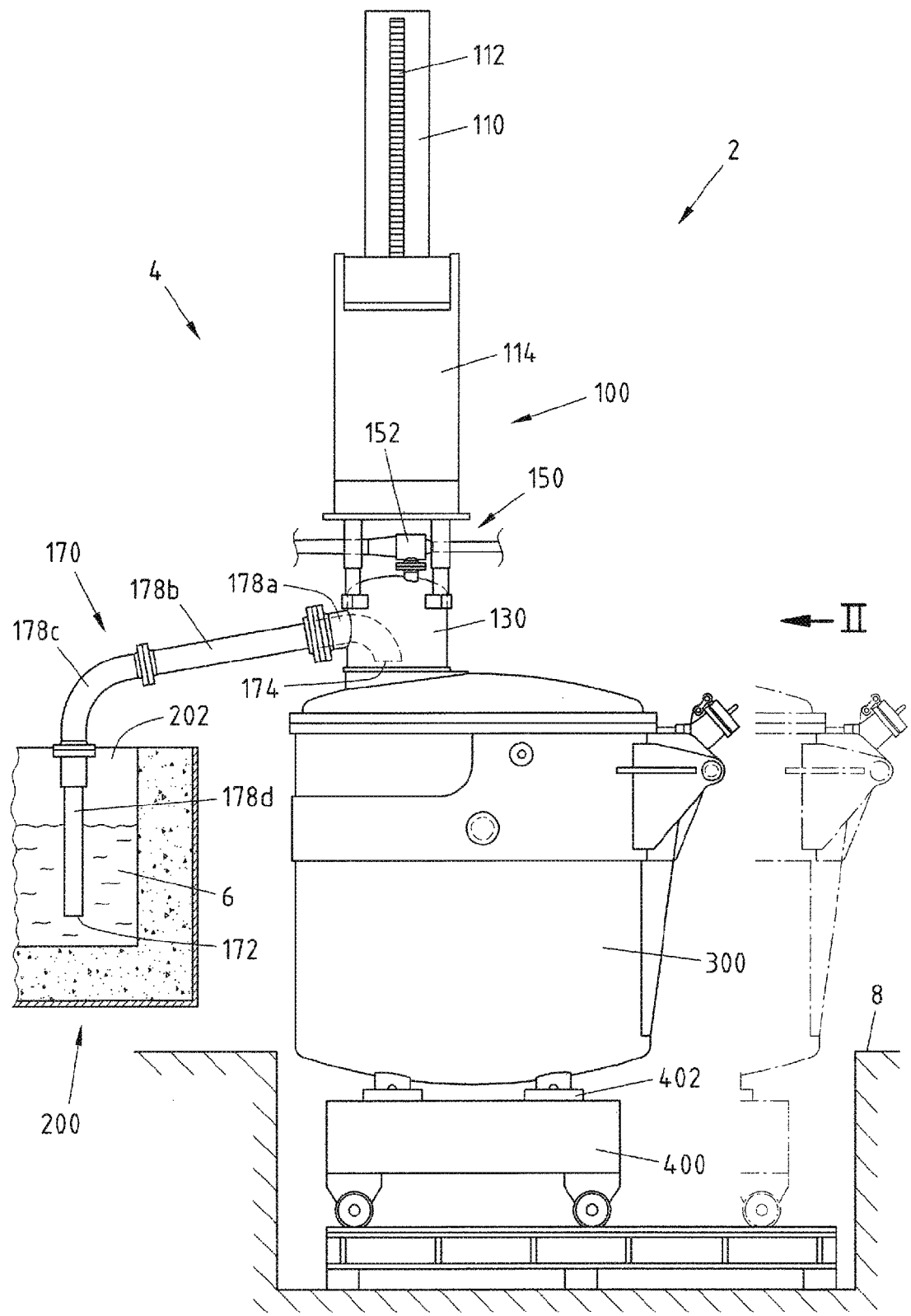
FIG. 1 shows in a partial sectional side view an exemplary embodiment of a station for transferring a metal melt from a melting furnace into a transport crucible, an associated assembly with a melting furnace and an associated system with a transport crucible.
Figure 2:
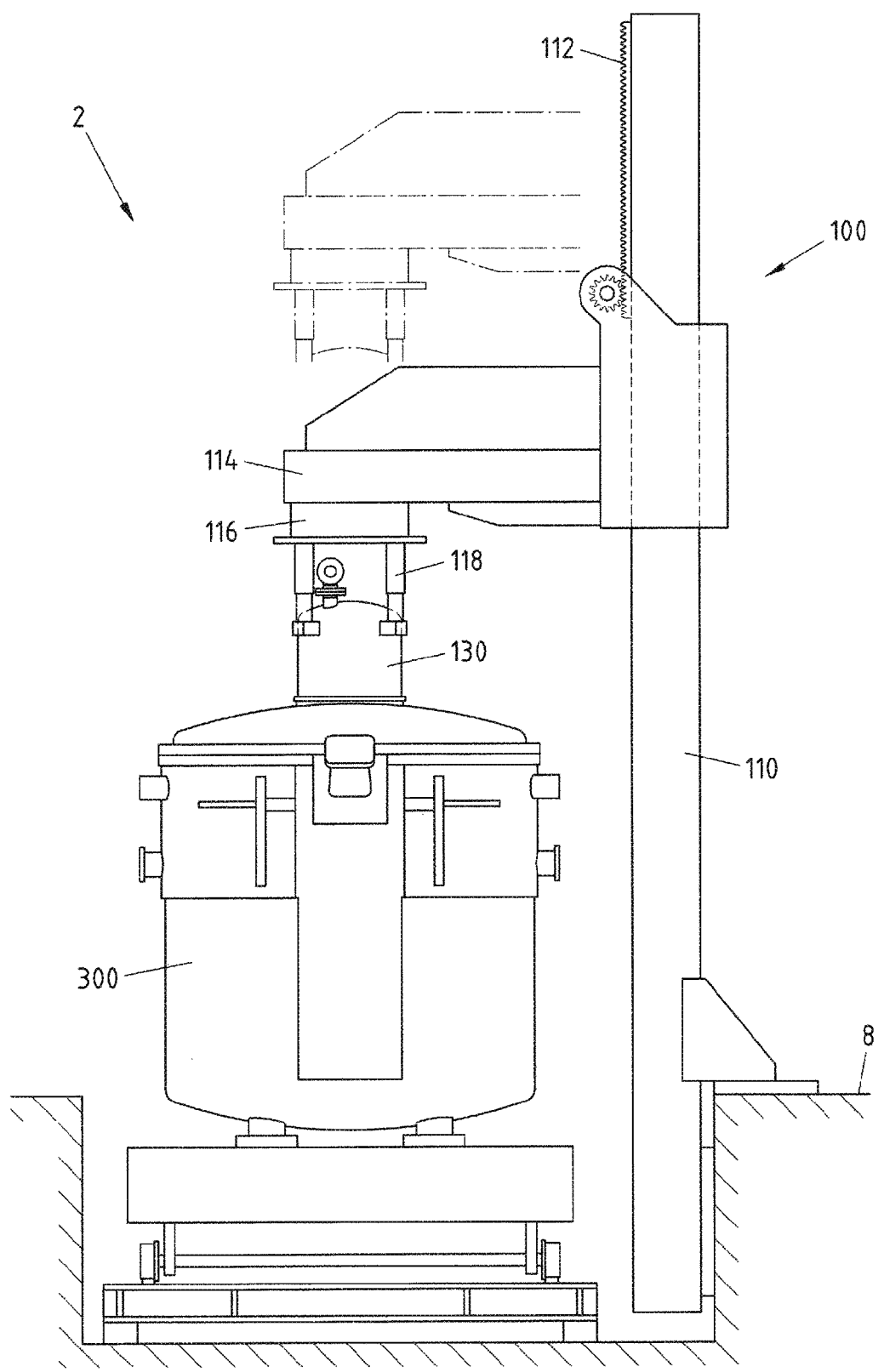
FIG. 2 shows the exemplary embodiment of FIG. 1 in a front partial sectional view.

FIGS. 1 and 2 show a system 2, which includes an assembly 4 with a station 100 and a melting furnace 200, a transport crucible 300 and a transfer carriage 400 for moving the transport crucible 300 between an placing position (chain-dotted line in FIG. 1) and a filling position (continuous line in FIG. 1). FIG. 1 shows a side view and FIG. 2 a front partial sectional view from the direction identified "II" in FIG. 1.

In FIGS. 1 and 2 the docking chamber 130 is docked to the transport crucible 300. By contrast, FIG. 3 shows an enlarged and more detailed section from FIG. 1 at a point in time of the method shortly before the docking chamber 130 is docked to the transport crucible 300, i.e. at the time when the docking chamber 130 and the transport crucible 300 are still spaced apart from one another.

The station 100 for transferring a metal melt 6 from the melting furnace 200 to the transport crucible 300 comprises in particular a stationary framework 110, a docking chamber 130, a suction device 150 configured for suctioning a gas from the docking chamber 130 and/or from the transport crucible 300, and also a suction pipe 170 with a suction channel 176 extending between an inlet opening 172 and an outlet opening 174.

The framework 110 is firmly connected to a foundation 8 and has a lifting device 112 in the form of a linear drive, with which an outrigger 114 can be driven in the vertical direction between an upper position (chain-dotted line in FIG. 2) and a lower position (continuous line in FIG. 2). The docking chamber 130 is mounted via a rotary drive 116 and four springs 118 to the outrigger 114 and thus directly also to the framework 110. By means of the rotary drive 116 the docking chamber 130 can be rotated about a substantially vertical axis. In addition, the docking chamber 130 is resiliently supported in the vertical direction by the springs 118.

The docking chamber 130 is in the shape of a vacuum vessel and on the one hand is designed to withstand the pressures occurring under a reduced pressure in the docking chamber 130, and on the other hand has a tightness that allows the generation and maintenance of a reduced pressure in the docking chamber 130.

On its lower side, the docking chamber 130 has a docking opening 132, with which the docking chamber 130 can be docked to a filling opening 302 of the transport crucible 300 when this is in the filling position. The docking chamber 130 has for this purpose a flange-like edge 134 with a smooth surface surrounding the docking opening 132, which together with a flange-like edge 304 surrounding the filling opening 302 of the transport crucible 300 and a seal 306 arranged therein provides a gas-tight connection between the docking opening 132 and the filling opening 302, or between the docking chamber 130 and the transport crucible 300, respectively (FIG. 3).

The seal 306 can be securely connected in a fixed position to the flange-like 304 edge for example by means of a dovetail connection. In addition, the docking chamber 130 has a laterally welded-on attachment pipe 136 with a flange 138, which serves for the mounting of the suction pipe 170.

The docking chamber 130 also has a filling level sensor 140 for checking the filling level of the metal melt in a transport crucible 300 docked to the docking chamber 130 (FIG. 3). The filling level sensor 140 includes two electrodes 142$a$-$b$ projecting from the docking opening 132, which are connected to sensor electronics (not illustrated), wherein the sensor electronics are configured to detect a short-circuit between the electrodes 142$a$-$b$. In this way the time at which the metal melt in the filling of a transport crucible 300 reaches the electrodes 142 $a$-$b$ extending in the transport crucible 300 and thereby produces a short-circuit can be detected with the filling level sensor 140. The filling level sensor 140 can for example be coupled to an emergency shutdown in order to prevent an overfilling of the transport crucible 300.

In order to prevent an unintended short-circuit of the electrodes 142 a-b caused by metal melt exiting from the outlet opening 174 of the suction pipe 170, the suction chamber can have a protective plate 144 that is arranged between the electrodes 142*a-b* and the outlet opening 174 of the suction pipe 170. The protective plate 144 can consist for example of steel and/or refractory concrete.

The suction device 150 includes a Venturi nozzle 152, whose schematic structure is illustrated in FIG. 4. The Venturi nozzle 152 comprises a flow channel 154 with a cross-sectional constriction 156, in which region a suck-in channel 158 leads into the flow channel 154. The flow channel 154 is attached to a compressed air supply 160, with which air can be fed through the flow channel 154. Owing to the cross-sectional constriction 156, there is an increase in the velocity of the air flowing through the flow channel 154 and at the same time a drop in pressure, so that gas is suctioned from the suck-in channel 158. The suck-in channel 158 is attached to the docking chamber 130 in such a way that a gas can be suctioned from the docking chamber 130 and/or from the transport crucible 300.

The suction pipe 170 runs from the inlet opening 172 arranged outside the docking chamber 130 through the attachment pipe 136 into the docking chamber 130 and then to an outlet opening 174. The outlet opening 174 is in FIG. 1 arranged within the docking chamber 130. It can however also be arranged in the plane of the docking opening 132 or outside the docking chamber 130, in particular underneath the docking opening 132, wherein the suction pipe 170 extends through the docking opening 132. The assembly of the outlet opening 174 within the docking chamber 130 and thus above the plane of the docking opening 132 is however preferred, since in this way formation of slag at the suction pipe 170 can be prevented and the suction pipe 170 running free from the metal melt can be ensured.

In FIG. 1 the suction pipe 170 is formed by a plurality of tubular section 178*a-d* flanged to one another. Alternatively the suction pipe 170 can however also be formed in one piece.

The tubular section 178*a* is inserted into the attachment 136 such that the outlet opening 174 is arranged within the docking chamber 130 and points substantially downwards. The flange 180*a* of the tubular section 178*a* is arranged between the flange 138 of the attachment pipe 136 and a flange 180*b* of the tubular section 178*b* and is connected, in particular screwed, to this. For a better sealing of the connection of the attachment pipe 136 and the two tubular sections 178*a-b* a seal or another sealing means can be arranged respectively between the flange 180*a* and the flange 180*b* or between the flange 180*a* and the flange 138. By means of this construction of the docking chamber 130 and suction pipe 170 the suction pipe can be mounted in a simple manner to the docking chamber 130 or removed from the latter, respectively, for example for repair or maintenance purposes.

The tubular section 178*d* in the region of the inlet opening 172 of the suction pipe 170 runs substantially in a vertical direction, so that the inlet opening 172 can be immersed into the metal melt 6 in the melting furnace 200 by vertically driving the docking chamber 130 and the suction pipe 170 firmly connected thereto through the extraction opening 202 of the melt furnace 200. The tubular sections 178*b-d* can for example have substantially the same external dimensions and/or substantially the same internal dimensions.

The station 100 and/or the transfer carriage 400 are preferably positioned and configured such that the metal melt 6 to be transferred from the melting furnace 200 to the transport crucible 300 has to be raised by a height of at most 50 cm. In particular the highest point of the suction pipe 170 when the docking chamber 130 is docked is located at most 50 cm above the filling height of the metal melt in the melting furnace 200. In this way a quicker transfer of the metal melt 6 to the transport crucible 300 can be achieved with a lower pressure difference between the interior of the transport crucible 300 and the surrounding atmosphere.

The suction pipe 170 or individual tubular sections 178*a-d* of the suction pipe 170, respectively, can for example consist of a cast alloy, for example cast iron, such as for example haematite pig iron. In the region of the inlet opening 172 the suction pipe 170 can likewise consist of a cast alloy or also of a ceramic material. In order to extend the service life the suction pipe 170 can be partially or completely lined with refractory material, for example with refractory concrete or ceramic material. For example the suction pipe 170 or one or more of the tubular section 178*a-d* can have an outer jacket 182 of metal and in inner layer 184 of refractory material.

Figure 5:
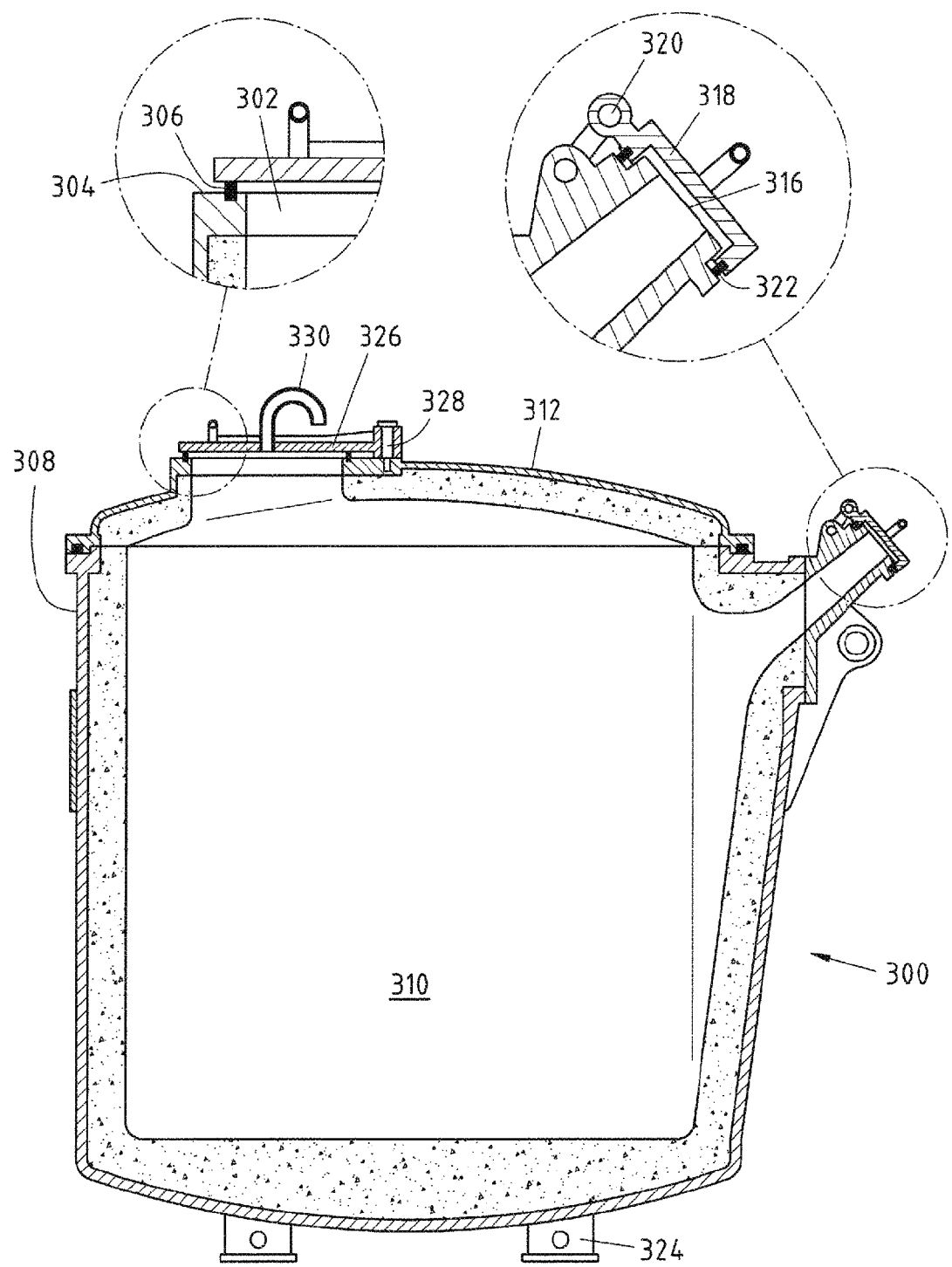
FIG. 5 shows the transport crucible of FIG. 1 in a partial side view.

FIG. 5 shows a sectional view of the transport crucible 300. The transport crucible 300 comprises a crucible vessel 308 for containing the metal melt 6 in its interior 310 as well as a crucible cover 312, which is connected in a gas-tight manner to the crucible vessel 308. The filling opening 302 is arranged in the crucible cover 312. Furthermore the crucible vessel 308 also contains a filling spout 314, through the opening 316 of which metal melt can be poured from the transport crucible 300 by tilting the transport crucible.

The transport crucible 300 furthermore has a cover 318 for the substantially gas-tight closure of the opening 316 of the filling spout 314. The cover 318 is in FIG. 5 connected via a hinge 320 to the crucible vessel 308 and by swiveling can thus be placed over the opening 316. A seal 322 is provided in the cover 318 to ensure a substantially gas-tight seal.

The transport crucible 300 is designed such that a reduced pressure can be produced in the interior 310 of the transport crucible 300 by suctioning a gas through the filling opening 302. To this end the transport crucible 300 is sealed such that the interior 310 with the closed cover 318 is sealed in a gas-tight manner, apart from the filling opening 302. In particular, any seams of the crucible vessel 308 and/or the cover 318 are preferably continuously welded and the transport crucible 300 also has no other leakage points. Preferably the transport crucible 300 is designed for a reduced pressure of at least 0.3 bar, preferably at least 0.6 bar, relative to the ambient pressure.

On the lower side the transport crucible 300 has feet 324 for deploying the transport crucible. The transfer carriage 400 in FIG. 1 has receptacles 402 adapted to the feet 324, into which the feet 324 of the transport crucible 300 can be inserted so that the transport crucible can be safely driven between the placing position (shown by chain-dotted line in FIG. 1) and the filling position (shown by continuous line in FIG. 1). By means of the receptacles 402 the transport crucible 300 can be reliably positioned in a predetermined position on the transfer carriage 400.

For the transport of the transport crucible 300 after the filling with metal melt the transport crucible 300 has a cover 326 for closing the filling opening 302. The cover 326 is connected by a hinge 328 to the crucible cover 312 and can thus be closed over the filling opening 302 after the filling. In this way metal melt can be prevented from splashing out from the filling opening 302 and impurities can be prevented from passing through the filling opening 302 into the interior 310 of the transport crucible 300 during the transport of the transport crucible.

A ventilation pipe 330 is provided in the cover 326, through which an exchange of air is possible between the interior 310 and the surroundings. In this way an undesired excess pressure or reduced pressure in the transport crucible 300 can be prevented when the cover 326 is closed. In particular the ventilation through the ventilation pipe 330 facilitates the pouring out of metal melt through the filling spout 314.

An exemplary embodiment of the method for transferring metal melt 6 from the melting furnace 200 to the transport crucible 300 by means of the station 100 will now be described hereinafter.

At the start of the method the transfer carriage 400 is located in the placing position (chain-dotted line in FIG. 1) and the outrigger 114 is located in the upper position (chain-dotted line in FIG. 2).

The transport crucible 300 is placed with the feet 322 in the receptacles 402 of the transfer carriage 400 and is then driven by actuating a provided linear drive (not illustrated) from the placing position to the filling position (continuous line in FIG. 1). In order to be able to position the transfer carriage 400 and thus the transport crucible accurately in the filling position, a limit switch, for example a contact switch or a photoelectric barrier, can be provided, which can be used to determine when the filling position is reached and by means of which the linear drive for example can be controlled. The filling spout 314 of the transport crucible 300 is sealed in a gas-tight manner by the cover 318 and the filling opening 302 is open.

In or at the docking chamber 130 it can optionally be established with a sensor 146 provided for this purpose whether the filling opening 302 of the transport crucible 300 is arranged underneath the docking chamber 130, and/or whether the filling opening 302 is free, in particular is not closed by the cover 326, so that the docking chamber 130 can be docked at the filling opening 302.

As soon as the transport crucible 300 is positioned in the filling position, the docking chamber 130 is docked with the docking opening 132 to the filling opening 302 of the transport crucible 300 by driving the outrigger 114 down to the lower position (continuous line in FIG. 2). The resilient support of the docking chamber 130 by the springs 118 thereby ensures a reliable positioning of the docking chamber 130 so as to produce a tight connection between the docking opening 132 and the filling opening 302, especially also with certain tolerances in the movement of the outrigger 114.

Preferably the docking chamber 130 is arranged horizontally with respect to the filling position in such way that the docking chamber 130 simply has to be lowered in a vertical direction for docking to the transport crucible 300. In this way the docking can be carried out reliably and quickly.

Together with the docking chamber 130 the suction pipe 170 connected to the docking chamber 130 is also lowered when lowering the outrigger 114, so that the inlet opening 172 is immersed through the extraction opening 202 into the melting furnace 200 and into the metal melt 6.

In the next step the suction device 150 is activated by blowing compressed air through the compressed air feed line 160 into the flow channel 154 of the Venturi nozzle 152, so that gas is suctioned from the suck-in channel 158 and thus from the docking chamber 130 connected to the suck-in channel 158 or from the transport crucible 300 connected to the docking chamber 130, respectively.

Since the inlet opening 172 of the suction pipe 170 is immersed into the metal melt 6 and the gas volume of the interior 310, of the docking chamber 130 and of the suction channel 176 is thus separate from the ambient atmosphere, a reduced pressure is produced in the docking chamber 130 and in the transport crucible 300. Preferably the compressed air supply line 160 to the Venturi nozzle 152 is adjusted such that in the transport crucible 300 a pressure difference relative to the ambient pressure, i.e. the pressure of the atmosphere surrounding the transport crucible 300, is established in the range from 0.3 to 0.8 bar, preferably 0.6 to 0.7 bar. A pressure difference in this range could for example be achieved with a compressed air flow through the Venturi nozzle 152 of ca. 430 m$^3$/h with a pressure of the compressed air from the compressed air supply line 160 of ca. 5.2 bar.

Owing to the reduced pressure in the transport crucible 300, in the docking chamber 130 and in the suction channel 176, metal melt 6 is suctioned through the inlet opening 172 of the suction pipe 170 (in other words, is forced from outside into the suction pipe 170 owing to the higher ambient pressure) and is led through the suction channel 176 into the transport crucible 300.

When the desired amount of metal melt 6 has been transferred to the transport crucible 300, the suction device 150 is deactivated and if necessary ventilated, in order to stop the flow of the metal melt 6 through the suction channel 176 and into the transport crucible 300. The point in time at which the suction device 150 has to be deactivated in order to achieve the desired amount of metal melt 6 is determined by means of a weighing device (not illustrated) incorporated in the transfer carriage, by means of which the filling level in the transport crucible 300 can be measured. In this way the amount of transferred metal melt can be accurately metered.

In order also to prevent an overfilling of the transport crucible 300 in the event of a failure of the weighing device, the filling level sensor 140 is in addition configured to deactivate the suction device 150 if a short-circuit of the electrodes 142 a-b is detected.

After the deactivation and optional ventilation of the suction device 150 the outrigger 114 is driven again to the upper position (chain-dotted line in FIG. 2), so that the docking chamber 130 can be uncoupled from the transport crucible 300 and the inlet opening 172 of the suction pipe 170 can be removed from the metal melt 6.

The transport crucible 300 together with the transfer carriage 400 are then driven from the filling position (continuous line in FIG. 1) to the placing position (chain-dotted line in FIG. 1) and its filling opening 302 is closed with the cover 326. The transport crucible 300 can then be lifted down from the transfer carriage 400 and transported to the intended destination, for example to a casting station.

With the afore-described method and the afore-described station 100, the afore-described assembly 4 and the afore-described system 2, respectively, metal melt 6 can thus be transferred from the melting furnace 200 to the transport crucible 300 without mechanically moveable parts coming into contact with the metal melt 6. Furthermore an accurate metering of the transferred amount of metal melt 6 is made possible. Moreover an improvement of the work safety is achieved, since the metal melt 6 cannot splash about uncontrollably or splash from the transport crucible 300.

Figure 6:
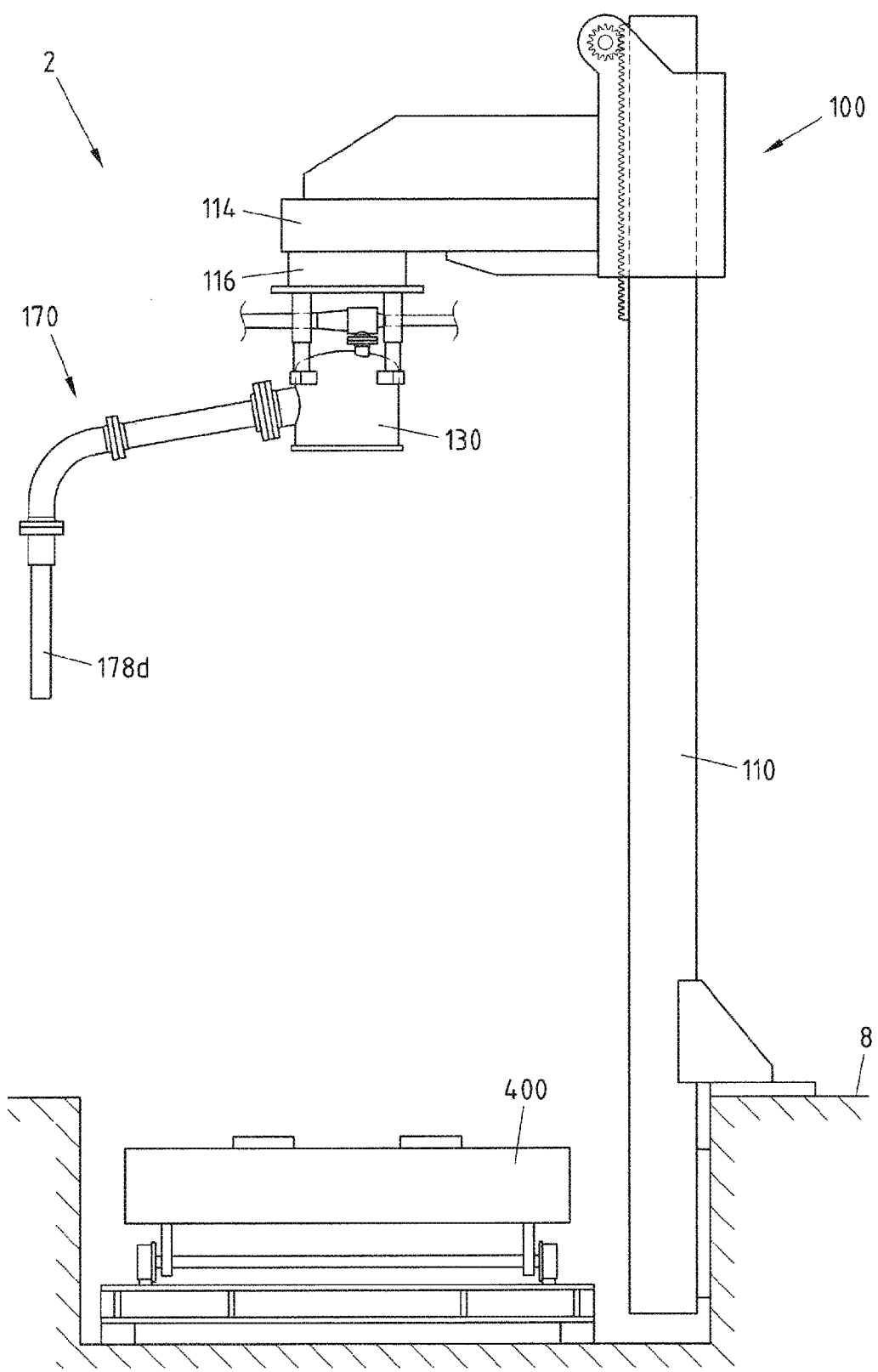
FIG. 6 shows the station of FIG. 1 in a repair and maintenance position in a front partial sectional view.

In addition the station 100 can be serviced or repaired during the operation of the melting furnace 200. For this purpose the station can be driven in particular to a repair and maintenance position, as is illustrated for example in FIG. 6. To this end in particular the outrigger 114 can be positioned in the upper position and the docking chamber 130 can then be rotated with the rotary drive 116 so that the suction pipe 170 connected to the docking chamber 130 is swivelled out from the region of the melting furnace 200 and can be repaired or partially or completely replaced outside the melting furnace 200.

Through the docking of a docking chamber 130 to the transport crucible 300 a space is made available with the interior of the docking chamber 130 that is well protected against metal melt 6 splashing around in the transport crucible 300, so that the components arranged in the docking chamber 130, for example the end of the suction pipe with the outlet opening 174 of the sensor 146, are protected against metal splashes.

The invention claimed is:

1. A station for transferring a metal melt from a melting furnace to a transport crucible, the station comprising:
    a docking chamber having an interior volume and a docking opening, wherein the docking opening is configured to be sealably connected to a filling opening of a transport crucible,
    a suction device that is configured to suction a gas from the docking chamber or from a transport crucible docked to the docking chamber, and
    a suction pipe that has a suction channel extending between an inlet opening and an outlet opening, wherein the inlet opening is arranged outside the docking chamber and the outlet opening is arranged such that a metal melt flowing through the suction channel and exiting from the outlet opening passes through the docking opening.

2. The station according to claim 1, wherein the docking chamber has an attachment pipe, which is configured for mounting the suction pipe to the docking chamber by a flange connection.

3. The station according to claim 2, wherein the suction pipe has an exchangeable section, which can be inserted through the attachment pipe into the docking chamber.

4. The station according to claim 1, wherein the suction device has a suck-in channel with a suck-in opening for suctioning a gas, wherein the suck-in opening is arranged in the docking chamber and above the docking opening.

5. The station according to claim 1, wherein the outlet opening is arranged above the docking opening.

6. The station according to claim 1, wherein the station has a sensor configured to detect whether a filling opening of a transport crucible is arranged underneath the docking chamber or whether the filling opening of the transport crucible is free for the docking of the docking chamber.

7. The station according to claim 1, wherein the docking chamber is resiliently supported.

8. The station according to claim 1, wherein the suction device configured for suctioning a gas from the docking chamber includes a Venturi nozzle.

9. An assembly comprising:
    a melting furnace that has a extraction opening for removing a metal melt, and
    the station according to claim 1,
    wherein the station is configured such that the inlet opening of the suction pipe can be immersed through the extraction opening of the melting furnace into a metal melt in the melting furnace.

10. The assembly according to claim 9, further comprising a transfer carriage configured for driving the transport crucible between a placing position and a filling position relative to the station, wherein the filling position is arranged such that the docking chamber can be docked to a filling opening of the transport crucible.

11. The assembly according to claim 9, further comprising a weighing device that is arranged and configured to weigh the transport crucible during the transfer of a metal melt from the melting furnace to the transport crucible.

12. The assembly according to claim 10, wherein the station comprises a lifting device, which is configured for substantially vertical movement of the docking chamber or of the suction pipe, and wherein the assembly is configured such that the transport crucible can be positioned in a predetermined position on the transfer carriage and can be driven by a linear movement of the transfer carriage to the filling position, in such a way that the filling opening of the transport crucible can be positioned at a predetermined position underneath the docking chamber and the docking chamber can by a vertical movement be docked to the filling opening of the transport crucible.

13. A method for transferring a metal melt from a melting furnace to a transport crucible using the assembly according to claim 9, the method comprising the following steps:
    providing the transport crucible in the filling position;
    docking the docking chamber with the docking opening at the filling opening of the transport crucible;
    positioning the inlet opening of the suction pipe in the metal melt in the melting furnace;
    activating the suction device so that a reduced pressure relative to the ambient pressure is generated in the docking chamber or in the transport crucible, so that the metal melt is suctioned through the inlet opening of the suction pipe and passes through the suction channel into the transport crucible.

14. The method according to claim 13, wherein a reduced pressure with a pressure difference between 0.3 and 0.8 bar relative to the ambient pressure is generated in the docking chamber or in the transport crucible.

15. The station according to claim 4, wherein the suck-in opening is arranged at least 10 cm above the docking opening.

16. The station according to claim 5, wherein the outlet opening is arranged at least 10 cm above the docking opening.

17. The method according to claim 13, wherein a reduced pressure with a pressure difference between 0.6 and 0.7 bar relative to the ambient pressure is generated in the docking chamber or in the transport crucible.

* * * * *